United States Patent
Sachs et al.

(10) Patent No.: US 7,421,121 B2
(45) Date of Patent: Sep. 2, 2008

(54) SPECTRAL NORMALIZATION USING ILLUMINANT EXPOSURE ESTIMATION

(75) Inventors: Todd Stephen Sachs, Palo Alto, CA (US); Richard L. Baer, Los Altos, CA (US); Xuemel Zhang, Mountain View, CA (US); Dwight Poplin, Corvallis, OR (US)

(73) Assignee: Micron Technology, Inc., Boise, ID (US)

( * ) Notice: Subject to any disclaimer, the term of this patent is extended or adjusted under 35 U.S.C. 154(b) by 597 days.

(21) Appl. No.: 11/054,095

(22) Filed: Feb. 8, 2005

(65) Prior Publication Data

US 2006/0177127 A1    Aug. 10, 2006

(51) Int. Cl.
G06K 9/00    (2006.01)
(52) U.S. Cl. .................. 382/167; 382/166; 382/254; 382/274; 382/305
(58) Field of Classification Search ............. 382/164, 382/165, 166, 167, 274, 254, 266, 305; 358/516, 358/518, 1.9; 356/406; 348/222.1, 223.1
See application file for complete search history.

(56) References Cited

U.S. PATENT DOCUMENTS

| 4,584,598 | A | | 4/1986 | Kutaragi |
| 5,099,313 | A | | 3/1992 | Suemoto |
| 5,387,930 | A | * | 2/1995 | Toh .......................... 348/222.1 |
| 6,038,339 | A | | 3/2000 | Hubel |
| 6,072,281 | A | * | 6/2000 | Ogawa ..................... 315/241 P |
| 6,515,275 | B1 | | 2/2003 | Hunter |
| 6,573,932 | B1 | * | 6/2003 | Adams et al. ............ 348/224.1 |
| 7,184,080 | B2 | * | 2/2007 | Kehtarnavaz et al. ..... 348/223.1 |
| 2002/0118967 | A1 | * | 8/2002 | Funston ....................... 396/155 |
| 2004/0189821 | A1 | * | 9/2004 | Oda et al. ................. 348/223.1 |
| 2005/0012948 | A1 | * | 1/2005 | Gotoh et al. .................. 358/1.9 |
| 2006/0050335 | A1 | * | 3/2006 | Dorrell et al. ............... 358/516 |

FOREIGN PATENT DOCUMENTS

| EP | 1351524 | | 10/2003 |
| EP | 1583371 | A1 | 10/2005 |
| JP | 04-170887 | | 6/1992 |

OTHER PUBLICATIONS

United Kingdom Application No. 0600521.9 Search Report dated Aug. 25, 2006.

* cited by examiner

*Primary Examiner*—Matthew C. Bella
*Assistant Examiner*—Ali Bayat
(74) *Attorney, Agent, or Firm*—RatnerPrestia

(57) ABSTRACT

After image capture, scene parameters are analyzed, e.g. lux, flicker, or world estimation. A best guess illuminant for the scene parameters is determined. At this point, the white balancing coefficients corresponding to that illuminant may be applied.

19 Claims, 3 Drawing Sheets

SPECTRAL NORMALIZATION USING ILLUMINANT EXPOSURE ESTIMATION

BACKGROUND

Image capture devices, e.g. digital cameras, include image sensors. Each image sensor attempts to model human vision and perception. However, image sensors do not 'see' the world with the same spectral responsivities as the human eye. Moreover, imaging sensors respond differently when different lights illuminate the same surface. Humans, however, adapt their color response so that surfaces appear to be approximately the same despite differences in scene illumination. This adaptive brain response is referred to as "color constancy".

Spectral normalization is used as part of digital image rendering as an illumination balancing technique to mimic "color constancy". Thus, the image sensors try to transform the digital image pixel values such that when they are displayed they create the perception that the surfaces in the image (originally illuminated by the scene illuminant) are illuminated by the same and, hopefully, desirable rendering illuminant, such as daylight.

There are two general strategies for performing illuminant estimation. One approach is to use a fixed color correction matrix and statistics derived from each image to create the white balancing coefficients, e.g. "Gray World", "Beige World". A second method is to pre-compute a set of matrices for likely scene illuminants and to use statistics from the image to choose the best matrix (from the set of pre-computed matrices) for that particular image.

When using a "color transformation matrix", it is assumed that the colors in the captured scene integrate to a neutral color, e.g. gray or beige. The average R, G, and B values are calculated for the neutral color. The pixels in the captured image are adjusted accordingly. Fixed color correction matrices fail to accurately render images that are single color images or dominant color images. Dominant color images are quite common as they include relatively large expanses of a single color, e.g. sky, water, or grass. In such scenes, it cannot be assumed that the overall image integrates to the neutral color.

SUMMARY

After image capture, scene parameters are analyzed, e.g. lux, flicker, or world estimation. A best guess illuminant for the scene parameters is determined. At this point, the color correction matrix corresponding to that illuminant may be applied.

Alternatively, the difference between the best guess illuminant and the world estimation is determined. If the difference exceeds a defined tolerance, the white balancing color coefficient corresponding to the world estimation is applied and a default color matrix is used based on lux level. If the difference is within a defined tolerance, the color correction matrix corresponding to the best guess illuminant is applied.

BRIEF DESCRIPTION

DETAILED DESCRIPTION OF THE DRAWINGS

Figure 1:
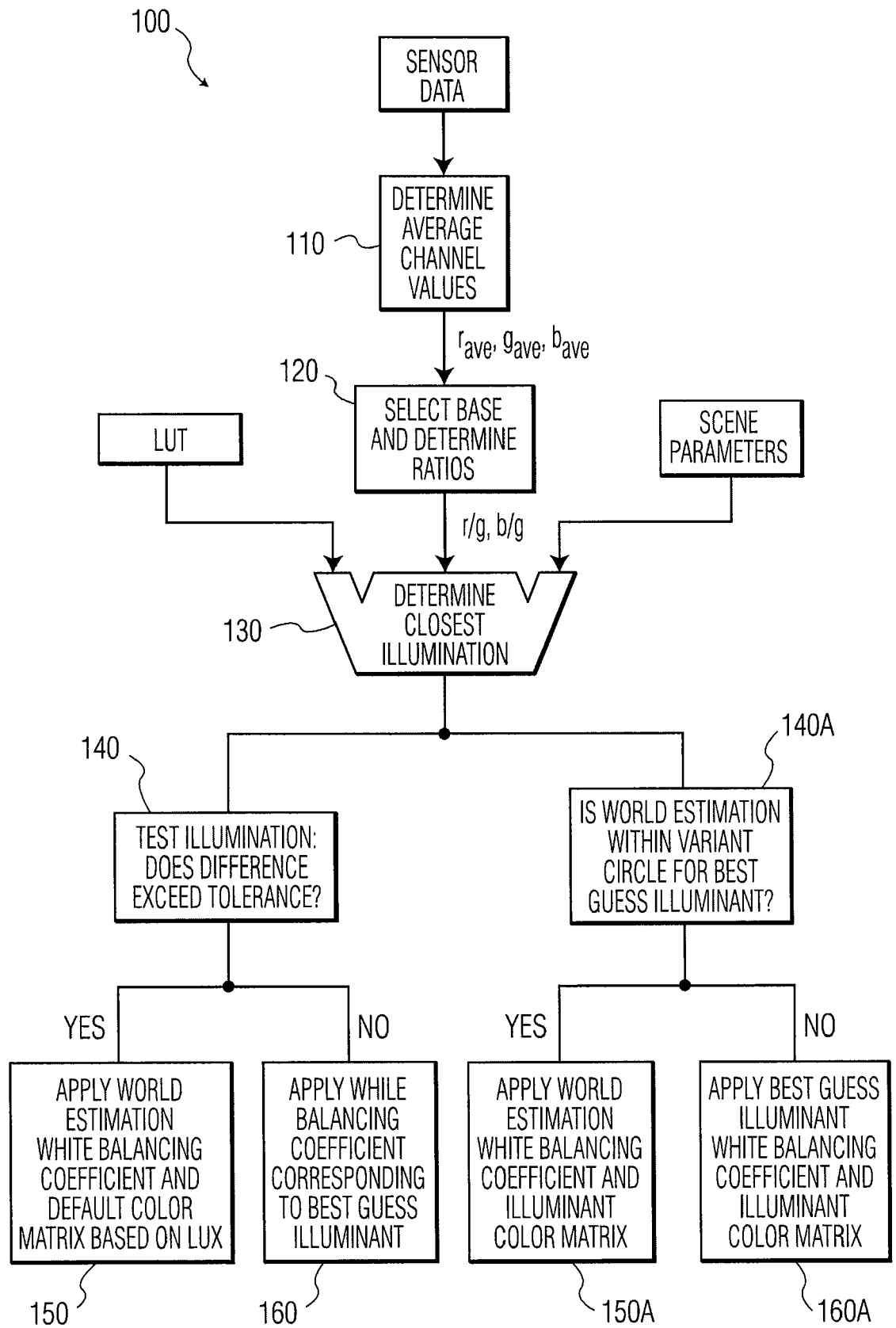
FIG. 1 illustrates a process flowchart according to the present invention.

FIG. 1 illustrates a process flowchart according to the present invention. In step 110, the image is captured. In step 120, scene parameters are analyzed, e.g. lux, flicker, world estimation, or auxiliary spectral measurements. In step 130, the best guess illuminant for the scene parameters is determined. At the point, the white balancing coefficient corresponding to that illuminant may be applied.

In step 140, the difference between the best guess illuminant and the world estimation is determined. In step 150, if the difference exceeds a defined tolerance, the white balancing coefficient corresponding to the world estimation is applied and a default color matrix is used based on lux level. In step 160, if the difference is within a defined tolerance, the white balancing coefficient corresponding to the best guess illuminant is applied.

Alternatively, in step 140A, it is determined whether the world estimation is within the variant circle for the best guess illuminant. In step 150A, if no, the white balancing coefficients corresponding to the best guess illuminant are applied. In step 160A, if yes, the white balancing coefficients corresponding to the world estimation is applied. For both decisions, the color matrix for the illuminant is applied.

In operation, the neutral world white balancing gains are computed normally. Then the plausible illuminant whose gains are closest to the neutral world gains is selected as the current illuminant. The neutral world may be selected from a group that includes grayworld, beigeworld, whiteworld, max pixel, etc.

Figure 2:
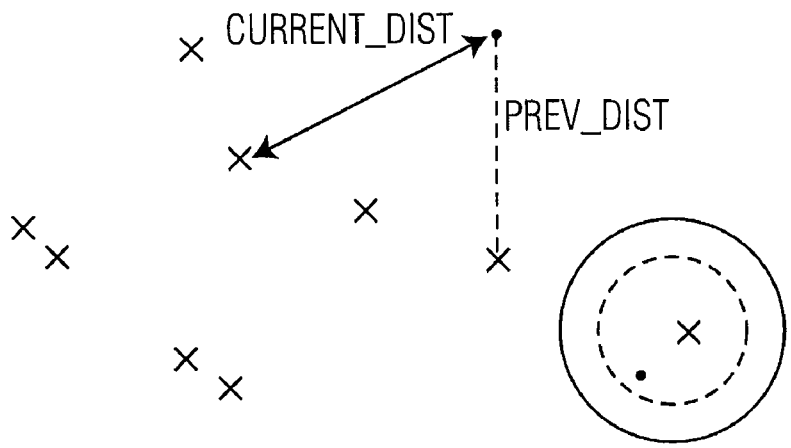
FIG. 2 illustrates is a graphical representation of acceptable illuminants.

FIG. 2 is a graphical representation of acceptable illuminants. There is a circle around each illuminant. The circle represents the acceptable tolerance with respect to a computed white balancing gain. Thus, if the computed gains (computed according to the selected neutral world) fall within the circle, they are directly used to white balance the image. If the computed gains fall outside of this circle, then the center point of the circle (e.g. the "fixed" white balance gains for this illuminant) are used to white balance the image. For both instances, the color matrix corresponding to the illuminant is used to color correct the image.

When the computed gains are on the boundary of the acceptable tolerance, e.g. circumference of the illuminant circle, the computed gains will jump in and out of tolerance on consecutive frames of video mode due to environmental parameters, e.g. noise and scene jumpiness. In this situation, the algorithm alternates between the fixed and computed white balancing gains. This is a noticeable and annoying artifact to the user.

Figure 3:
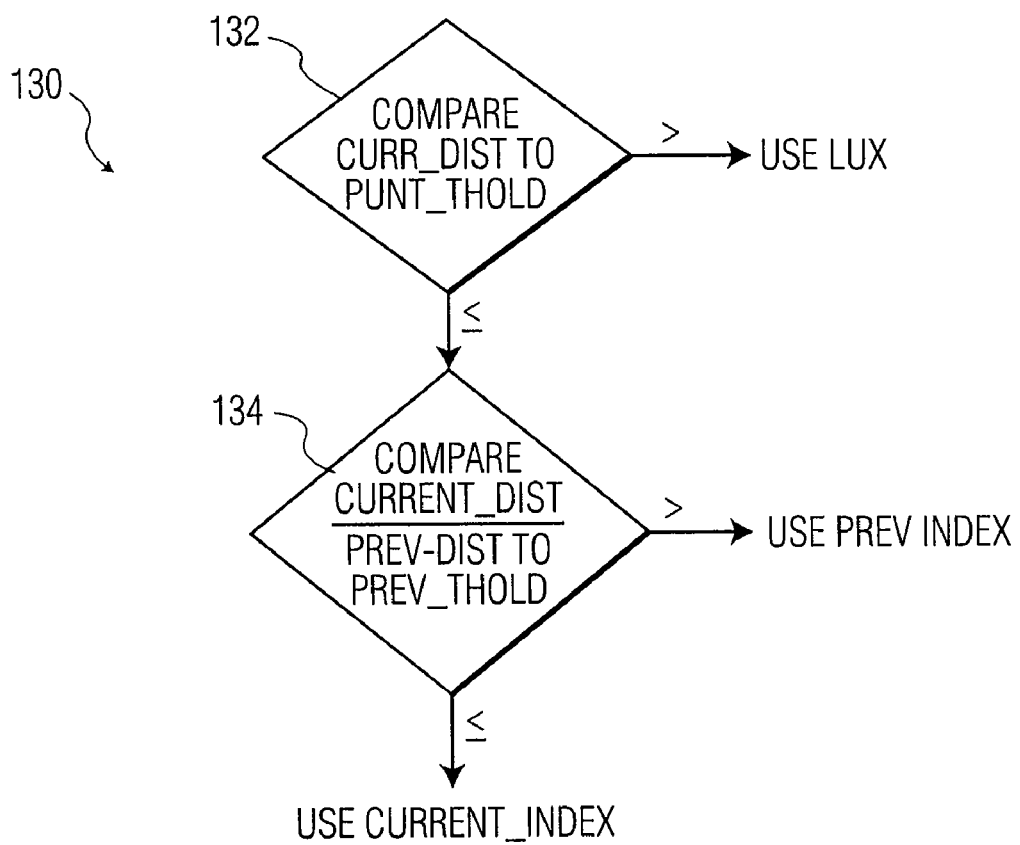
FIG. 3 is a process flowchart corresponding to a step shown in FIG. 1.
Figure 4:
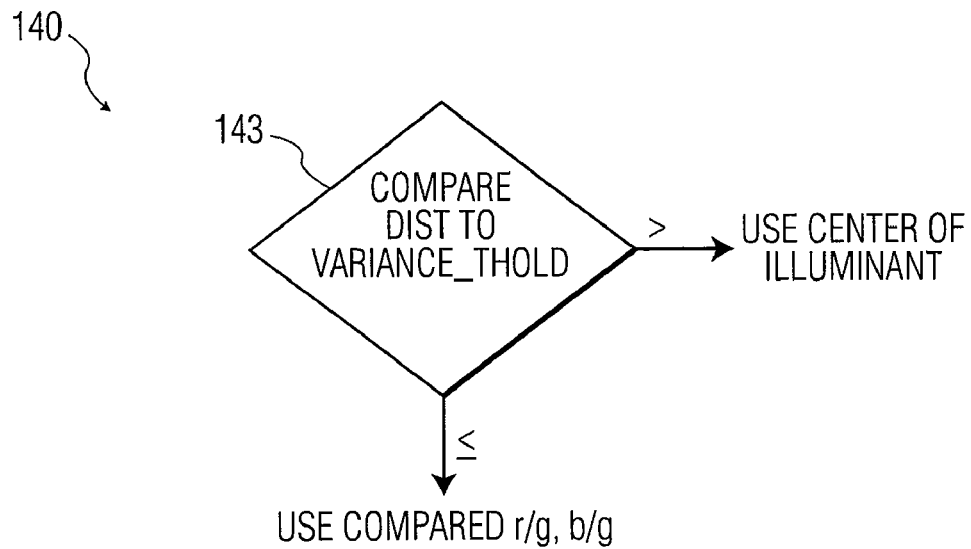
FIG. 4 is a process flowchart corresponding to a step shown in FIG. 1.

FIGS. 3 and 4 illustrate two hysteresis tests to keep the module from oscillating in video mode. First, the distance to the closest state has to be smaller than the distance to the previous state by N % (programmable) before the algorithm will switch (otherwise it reverts to the previous state). Second, if the neutral world gain is within a variance circle of the chosen state, it is left unchanged. If it's outside the circle, then it is snapped to the center of the chosen state (again with hysteresis—so that it must be greater than VAR+hyst to snap if the previous gains were inside the circle, and it must be less than VAR−hyst to NOT snap if the previous gains were outside the circle).

FIG. 3 illustrates a process flowchart corresponding to step 130. Step 130 determines the lux or illumination level. In step 132, the current distance is compared to the maximum-tolerance. If the current distance exceeds the maximum_tolerance, then the lux level is applied. The illumination level may correspond to DARK, NORMAL INDOOR, TRANSITION, INDIRECT DAY, and DIRECT DAY. If not, then in step 134, the ratio of the current distance to the previous distance is compared to the prev_thold or previous threshold. If the ratio exceeds the prev_thold, the previous index is applied. If not, the current index is applied.

To transition from one mode to neighboring mode, the lux level must cross the neighboring threshold by an amount greater than the lux hysteresis. There is no hysteresis test when jumping more than a single neighboring level is desired (from dark to transition). Thus, if the previous lux level was transition, the new Lux value must be greater than the Indirect Day boundary+Hyst to jump to the Indirect level. Similarly, it must be less that the Transition boundary−Hyst to jump to the Normal Indoor level.

FIG. 4 illustrates a process flowchart corresponding to step 140. In step 143, the distance is compared to the variance_thold. If the distance is exceeds the variance_thold, the center of the illuminant is applied. If not, then the normalized values of the red and blue channels are applied.

In this step, the hysteresis from jumping between illuminants on successive calls is managed. If the ratio of the distance squared between the current chosen best guess illuminant (e.g. the one with the minimum distance squared to the gray world point) and the previously selected illuminant is greater than this threshold, the previously selected illuminant is selected.

The plausible illuminants themselves are a subset of all of the common illuminants calibrated for the module. The subset is selected based on lux level, flicker depth, and possibly other metrics.

Figure 5:
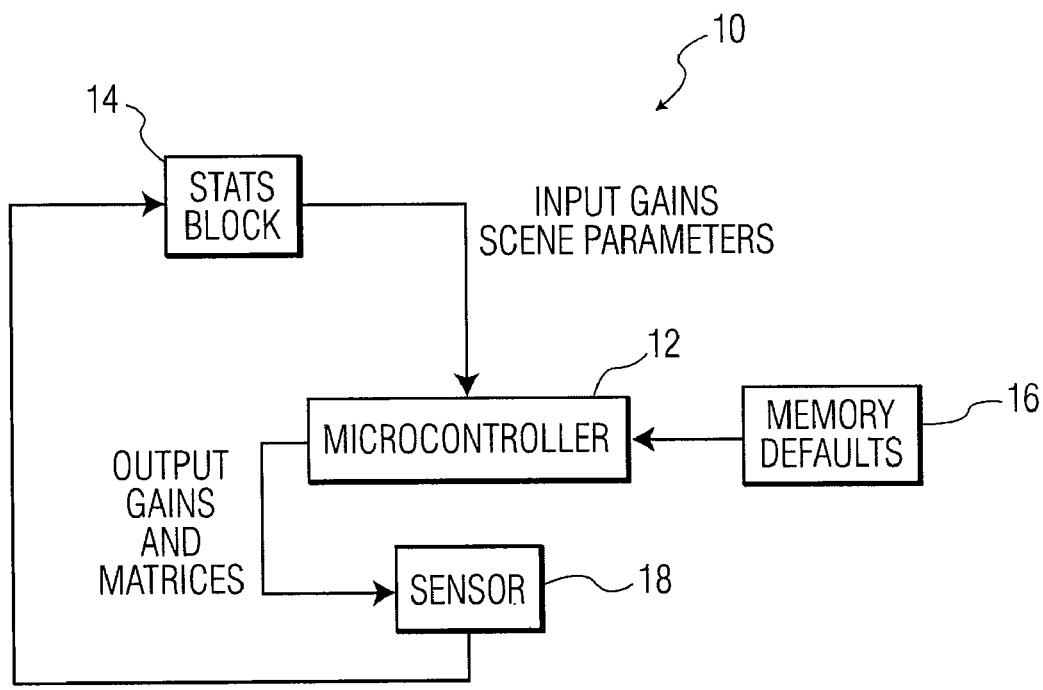
FIG. 5 is an illustrative functional block diagram according to the invention.

FIG. 5 illustrates a functional block digram 10 according to the present invention. A microcontroller 12 receives data from a STATS block 14 and Memory 16. The STATS block 14 contains information on current input gains, scene lux, flicker depth, and auxiliary spectral measurements. The Memory 16 contains default scene data. The microcontroller 12 send output gain information to the sensor 18. The gain information reflects how the color channels within the sensor should be adjusted. The sensor feeds 18 back its current status to the STATS block 14.

The invention claimed is:

1. A method for color correcting comprising:
   capturing an image;
   determining at least one scene parameter, which includes a world estimation for the image;
   determining a best guess illuminant according to the at least one scene parameter;
   determining a difference between the best guess illuminant and the world estimation;
   when the difference exceeds a tolerance, applying a white balancing coefficient corresponding to the world estimation to a color correction matrix;
   when the difference is within the tolerance, applying a further white balancing coefficient corresponding to the best guess illuminant to the color correction matrix; and
   applying the color correction matrix to the captured image.

2. A method, as defined in claim 1, wherein the at least one scene parameter further includes a scene parameter selected from a group that includes flicker depth, lux level, and auxiliary spectral measurements.

3. A method, as defined in claim 1, wherein the world estimation is selected from a group that includes beigeworld, grayworld, whiteworld, and Max Pixel.

4. A method, as defined in claim 1, wherein determining the best guess illuminant includes:
   comparing the current scene data to stored data; and
   selecting the best guess illuminant based on the comparison.

5. A method, as defined in claim 4, wherein the stored data is selected from a group comprising variance threshold, previous threshold, and maximum tolerance.

6. The method of claim 1, further comprising applying a default color matrix based on lux when the difference exceeds the tolerance.

7. A method for color correcting, comprising:
   capturing an image;
   determining a world estimation for the image;
   determining a best guess illuminant according to the world estimation;
   when the world estimation is within a variant circle for the best guess illuminant, applying a white balancing coefficient corresponding to the best guess illuminant to a color correction matrix;
   when the world estimation is outside the variant circle for the best guess illuminant, applying a further white balancing coefficient corresponding to the world estimation to the color correction matrix; and
   applying the color correction matrix to the captured image.

8. The method of claim 7, further comprising applying a color matrix corresponding to the world estimation when the world estimation is within the variant circle for the best guess illuminant.

9. The method of claim 7, further comprising applying a color matrix corresponding to the best guess illuminant when the world estimation is outside the variant circle for the best guess illuminant.

10. The method of claim 7, wherein the best guess illuminant is determined by selecting the best guess illuminant from among a plurality of predetermined illuminants.

11. The method of claim 10, wherein the best guess illuminant is selected by:
    comparing predetermined illuminant gains corresponding to each of the plurality of predetermined illuminants with predetermined world gains corresponding to a selected world, and
    selecting the predetermined illuminant that has corresponding predetermined illuminant gains that are closest to the predetermined world gains as the best guess illuminant.

12. The method of claim 10, wherein the plurality of illuminants include dark, normal indoor, transition, indirect day and direct day.

13. An apparatus comprising:
    a statistics block configured to monitor color corrected image signals provided by an image sensor and to provide scene parameter data from the image signals to the microcontroller;
    memory including default scene data configured to provide the default scene data to the microcontroller;
    a microcontroller configured to receive the scene parameter data and the default scene data from the statistics block and the memory, respectively, and to generate a gain signal and a color correction matrix based on the scene parameter data and the default scene data;

a sensor configured to receive the color correction matrix and, responsive to receiving the color correction matrix, to adjusting color channels in the sensor according to the color correction matrix.

14. An apparatus, as defined in claim 13, wherein the scene parameters are selected from a group including current input gains, scene lux, flicker depth, and auxiliary spectral measurements.

15. A method for color correcting comprising:

capturing a plurality of images;

determining a current world estimation for a current image of the plurality of images;

selecting a current best guess illuminant for the current image from among a plurality of predetermined illuminants;

comparing the current world estimation with a threshold value corresponding to the current best guess illuminant to compute a current difference value;

comparing the current difference value with a maximum tolerance value; and if the current difference value is greater than the maximum tolerance value, selecting the current best guess illuminant as a best guess illuminant for the current image.

16. The method of claim 15, further comprising:

determining a previous world estimation for a previous image of the plurality of images;

selecting a previous best guess illuminant for the previous image from among the plurality of predetermined illuminants;

comparing the previous world estimation with the threshold value corresponding to the previous best guess illuminant to compute a previous difference value; and comparing the previous difference value with the maximum tolerance value to determine a color matrix to apply to the captured image.

17. The method of claim 16, further comprising:

if the current difference value is less than or equal to the maximum tolerance value:

computing a ratio of the current difference value to the previous difference value, comparing the ratio with the threshold value corresponding to the previous best guess illuminant, if the ratio is greater than the threshold value corresponding to the previous best guess illuminant, selecting the current best guess illuminant as the best guess illuminant for the current image, and if the ratio is less than or equal to the threshold value corresponding to the previous best guess illuminant, selecting the previous best guess illuminant as the best guess illuminant for the current image.

18. A method for color correcting comprising:

capturing a plurality of images;

determining a current world estimation for a current image of the plurality of images and a previous world estimation for a previous consecutive image of the plurality of images;

for the current image and the previous consecutive image, comparing predetermined illuminant gains corresponding to each of a plurality of different illuminants with predetermined world gains corresponding to the current world estimation and the previous world estimation to obtain a current difference value and previous difference value, respectively;

selecting the predetermined illuminant with the closest gains as a previous best guess illuminant for the previous consecutive image; and selecting the predetermined illuminant with the closest gains as a current best guess illuminant for the current image if the current difference value is less than the previous difference value by a predetermined amount.

19. The method of claim 18, further comprising selecting the previous best guess illuminant as a current best guess illuminant for the current image if the current difference value is not less than the previous difference value by a predetermined amount.

* * * * *

UNITED STATES PATENT AND TRADEMARK OFFICE
CERTIFICATE OF CORRECTION

| | |
|---|---|
| PATENT NO. | : 7,421,121 B2 |
| APPLICATION NO. | : 11/054095 |
| DATED | : September 2, 2008 |
| INVENTOR(S) | : Sachs et al. |

Page 1 of 1

It is certified that error appears in the above-identified patent and that said Letters Patent is hereby corrected as shown below:

In column 4, line 16, in Claim 7, delete "correcting," and insert -- correcting --, therefor.

Signed and Sealed this

Fourth Day of November, 2008

JON W. DUDAS
*Director of the United States Patent and Trademark Office*